(12) United States Patent
Shibata et al.

(10) Patent No.: US 6,482,881 B1
(45) Date of Patent: Nov. 19, 2002

(54) INORGANIC DISPERSANT, STABILIZER FOR SUSPENSION POLYMERIZATION AND POLYMER PARTICLES

(75) Inventors: Hiroshi Shibata, Hyogo (JP); Yoichi Takahashi, Hyogo (JP); Hidemitsu Kasahara, Hyogo (JP); Mitsunobu Aoyama, Hyogo (JP); Shigeo Takiyama, Hyogo (JP)

(73) Assignee: Maruo Calcium Company Limited, Hyogo (JP)

( * ) Notice: Subject to any disclaimer, the term of this patent is extended or adjusted under 35 U.S.C. 154(b) by 0 days.

(21) Appl. No.: 09/678,105

(22) Filed: Oct. 4, 2000

(51) Int. Cl.⁷ .................................................. C08K 3/32
(52) U.S. Cl. ...................... 524/414; 524/425; 423/430; 423/635
(58) Field of Search ................................ 524/414, 425; 423/635, 430

(56) References Cited

U.S. PATENT DOCUMENTS 6,054,244 A * 4/2000 Kato et al. ................... 430/137
6,165,510 A * 12/2000 Baines et al. ................ 424/489

* cited by examiner

*Primary Examiner*—Edward J. Cain
(74) *Attorney, Agent, or Firm*—Armstrong Westerman & Hattori, L.L.P.

(57) ABSTRACT

Disclosed is an inorganic dispersant having a high specific surface area and a high surface activity which comprises a calcium phosphate type compound having a specific particle composition, particle shape, particle size and dispersibility, and specific surface area. When used as a suspension polymerization stabilizer, it provides polymer particles having a uniform and sharp particle size distribution, and when the polymer particles are contained in an unsaturated polyester resin composition and a toner composition, the obtained compositions have excellent quality.

16 Claims, 5 Drawing Sheets

INORGANIC DISPERSANT, STABILIZER FOR SUSPENSION POLYMERIZATION AND POLYMER PARTICLES

BACKGROUND OF THE INVENTION

1. Field of the Invention

The present invention relates to an inorganic dispersant, a stabilizer for suspension polymerization comprising said dispersant, polymer particles, unsaturated polyester resin compositions and toner compositions, using said polymer particles, more specifically, to an inorganic dispersant having a high specific surface area and a high surface activity, a stabilizer for suspension polymerization comprising said dispersant, polymer particles having a uniform and sharp particle size distribution obtained by the use of said dispersant, unsaturated polyester resin compositions and toner compositions, using said polymer particles.

2. Description of the Prior Art

For the production of spherical polymer particles, for example, a method for suspension polymerization and a method for dissolving a polymer in a solvent, dispersing the resulting solution in water to form a suspension and removing the solvent from the suspension have been known.

On the other hand, as an inorganic dispersant, effects of water-difficult soluble phosphates for suspension polymerization have been known from of old. Especially, a suspension polymerization agent of hydroxyapatite has been developed so as to enhance dispersibility of a polymerizable monomer in an aqueous medium. Such improvements are described in Japanese Examined Patent Publication No. 54-44313, Japanese Non-examined Patent Publication Nos. 5-222103, 6-220108, 7-102005 and 7-102006, in which a sedimentation half-life period and an electric conductivity are regarded as an index of improvement. In this index, as the sedimentation half-life period is long, and as the electric conductivity is low, it is suitable as a dispersant.

As uses of the water-difficult soluble phosphates for suspension polymerization, for example, in polymerization of polystyrene, there are known polymerization of general foamed polystyrene, polymerization of three-dimensional polymer fine particles as a low shrink agent for an unsaturated polyester resin composition (Japanese Non-examined Patent Publication No. 7-82305) and polymerization of a toner resin for electrostatic development. Further, production of fine polymer particles in use for a toner, there is known a method for dissolving a polymer in a solvent, dispersing the resulting solution in water to prepare a suspension, and removing the solvent from the suspension and it is reported that the water-difficult soluble phosphates for suspension polymerization are also effective in this method (Japanese Non-examined Patent Publication No. 9-230624).

In the suspension polymerization of styrene monomer for general purposes, there are known a dispersant type comprising organic surfactants such as polyvinyl alcohol and polyvinyl pyrrolidone and a dispersant type comprising a mixture of a water-difficult soluble inorganic salt such as calcium phosphate, hydroxyapatite and pyrophosphoric acid with an anionic surfactant such as sodium dodecylbenzene sulfonate, sodium α-olefin sulfonate and lauric sulfuric ester sodium salt. However, when the organic surfactant is used as a dispersant, it is mixed into polymer particles to decrease heat stability, transparency or mechanical strength or to increase COD in a polymerization waste liquid, and thus it is not preferable even from the viewpoint of the waste liquid treatment.

On the other hand, in the dispersant comprising a mixture of a water-difficult soluble inorganic salt and an anionic surfactant, high suspension stability is obtained with a less amount of the water-difficult soluble inorganic salt, but when styrene monomer is suspension polymerized in the presence of this dispersant, the particle size distribution of the polymer particles obtained becomes broad.

Although polymer particles comprising polystyrene as the main ingredient obtained by suspension polymerization are generally extrusion-molded or injection-molded to produce various molded articles, when polymer particles having a broad particle size distribution are used, feeding of polymer particles into a molding machine varies to result in an increase in a defective ratio of the molded articles. Moreover, the three-dimensional polymer fine particles as a low shrink agent for unsaturated polyesters degrade uniform dispersibility, gloss, low shrink property and transparency of molded articles of the unsaturated polyesters. Furthermore, as to a toner for electrostatic development, recently, development by the use of a color toner has been demanded in place of a monochrome toner, and on the other hand, in compliance with a high density movement of information, a fine particle toner having a high resolution has been demanded. However, such demand can not be satisfied with a toner of a pulverized type and therefore a toner having a sharp particle size distribution between 0.5 and 10 μm in particle size is demanded.

The uses of polymer particles containing polystyrene as the main ingredient include, for example, general uses of (1) to (3), use of (4) imparting uniform dispersibility, gloss, low shrink property and transparency to unsaturated polyester molded articles, and use of a toner (5), and particle sizes of the polymer particles required for such uses are determined as described below:

(1) Particle size ranging from about 0.4 to about 0.7 mm:
   Cups for use in instant food
(2) Particle size ranging from about 0.7 to about 1.8 mm:
   Various packages
(3) Particle size ranging from about 1.8 to about 3.0 mm:
   Boards for building materials
(4) Particle size ranging from about 30 to about 80 μm:
   Low shrink agent for unsaturated polyesters
(5) Particle size ranging from about 0.5 to about 10 μm:
   Toner for electrostatic development.

As stated above, the particle sizes required are different according to the uses of the polymer particles. That is, if the particle size does not fall in the given particle size distribution, the intended properties can not be satisfied. When the particle size distribution of the polymer particles is broad, the yield lowers noticeably. As to an inorganic dispersant as well, one adaptable to the properties required of polymer particles is needed.

It is said that the stabilization effect of hydroxyapatite as an inorganic dispersant increases as the particle size of hydroxyapatite is fine for the reason that the surface active energy becomes large. However, hydroxyapatite particles in a slurry obtained from the manufacturing process are usually fine and agglomerate with ease, which causes the particle size of polymer particles to be ununiform. As is apparent from that, it is important that the hydroxyapatite particles are not only fine, but excellent in dispersibility. To attain this object, it is a general method to subject an apatite slurry to a shearing dispersion treatment and deagglomeration.

However, it is extremely difficult to disperse uniformly agglomerates of apatite fine crystals synthesized from a calcium hydroxide slurry and phosphoric acid, which is a general synthetic method.

SUMMARY OF THE INVENTION

An object of the present invention is to provide an inorganic dispersant of a calcium phosphate type compound which gives polymer particles having excellent quality as well as an intended particle size and a sharp particle size distribution.

Another object of the present invention is to provide a stabilizer for suspension polymerization comprising the above inorganic dispersant capable of producing polymer particles which have not only an intended particle size and a sharp particle size distribution, but are excellent in quality.

Yet another object of the present invention is to provide polymer particles using the inorganic dispersant, which have not only an intended particle size and a sharp particle size distribution, but are excellent in quality.

A further object of the present invention is to provide an unsaturated polyester resin composition containing the polymer particles, which is improved in low shrink property.

A still further object of the present invention is to provide a toner composition containing the polymer particles, which is improved in image density, fog, resolution, scattering and cleaning.

In light of the foregoing situation, the present inventors have made an extensive series of studies and have found out that a calcium phosphate type inorganic dispersant having a specific particle composition, particle shape, particle size and dispersibility, and specific surface area is capable of providing polymer particles which have not only a sharp particle size distribution with an intended particle size, but excellent quality.

DETAILED DESCRIPTION OF THE INVENTION

The present invention is, in a first aspect, to provide an inorganic dispersant which comprises particles of a calcium phosphate type compound having a petaloid porous structure and an atomic ratio Ca/P of not more than 16.7, said particles satisfying the following formulas (a) to (g):

$0.1 \leq dx1 \leq 20 (\mu m)$,  (a)

$1 \leq \alpha \leq 5$, where $\alpha = d50/dx1$,  (b)

$0 \leq \beta \leq 2$, where $\beta = (d90-d10)/d50$,  (c)

$0.01 \leq dx2 \leq 1 (\mu m)$,  (d)

$95 \leq \omega 1 \leq 99$,  (e)

$70 \leq \omega 2 \leq 95$,  (f)

$50 \leq Sw1 \leq 500$,  (g)

wherein,
dx1: Average particle diameter ($\mu$m) measured by a photograph of an electron microscope;
α: Dispersion coefficient;
d50: 50% average particle diameter ($\mu$m) measured by a particle size distribution tester using a Microtrac FRA laser;
β: Sharpness;
d90: 90% particle diameter of the total particles passed through a sieve measured by a particle size distribution tester using a Microtrac FRA laser;
d10: 10% particle diameter of the total particles passed through a sieve measured by a particle size distribution tester using a Microtrac FRA laser;
dx2: Average micro pore diameter ($\mu$m) of particles measured from a micropore distribution measured by a mercury penetration method,;
ω1: Static percentage of voids (%) calculated from the following equation (h):

$$\omega 1 = \left\{ 1 - \frac{1}{2.9 \times [\text{apparent specific volume}]} \right\} \times 100 (\%) \quad (h)$$

wherein the apparent specific volume (ml/g) is measured according to a static method of pigment test according to JIS K5101-91 20.1, ω2: Pressurized percentage of voids (%) calculated from the following equation (i):

$$\omega 2 = \left\{ 1 - \frac{0.5}{2.9 \times 2 \times [\text{thickness}]} \right\} \times 100 (\%) \quad (i)$$

wherein the thickness is measured by a slide calipers after packing 0.5 g of a sample in a cylinder having a cross section of 2 cm$^2$, pressurizing the sample with a pressure of 30 kg/cm$^2$ for 30 seconds. Sw1: BET specific surface area m$^2$/g by a nitrogen adsorbing method.

The present invention is, in a second aspect, to provide a stabilizer for suspension polymerization which comprises the inorganic dispersant.

The present invention is, in a third aspect, to provide polymer particles obtainable by suspension polymerizing at least one of vinyl monomers capable of suspension polymerization in a mixture of a polymerization initiator, a dispersion medium and an inorganic dispersant.

The present invention is, in a fourth aspect, to provide polymer particles obtainable by dissolving a polymer in a solvent using the inorganic dispersant as a stabilizer, dispersing the solution in water to obtain a suspension, and removing the solvent from the suspension.

The present invention is, in a fifth aspect, to provide an unsaturated polyester resin composition containing the polymer particles as a low shrink agent.

The present invention is, in a sixth aspect, to provide a toner composition using the polymer particles.

The present invention relates, in a first aspect, to an inorganic dispersant and its important feature lies in the particle shape in the inorganic dispersant which comprises a porous calcium phosphate type compound of a petaloid structure. The inorganic dispersant of the present invention is such that it has a large surface activity as well as a high specific surface area to thereby exhibit a remarkable effect as an inorganic dispersant. Moreover, the inorganic dispersant of the present invention is uniform in particle size and excellent in dispersibility and thus it is possible to enhance the uniformity of a monomer and a polymerized intermediate during the polymerization and a polymer so that polymer particles having a uniform and sharp particle size distribution can be produced. That is, the inorganic dispersant of the present invention is able to provide the surface activity and dispersibility at the same time which conflict with each other as an inorganic dispersant. Such characteristics have never been expected with an ordinary apatite having an extremely fine particle size of about 0.1 $\mu$m and an oval shape.

That is, the inorganic dispersant of the present invention is comprised of a calcium phosphate-calcium carbonate composite or a calcium phosphate type compound and has a petaloid porous structure, large activity, uniform particle size and good dispersibility through the reaction of calcium carbonate with phosphoric acid.

The petaloid porous calcium phosphate type compound forming particles of an inorganic dispersant of the present invention is not specifically limited and includes, for example, amorphous calcium phosphate [ACP:$Ca_3(PO_4)_2 \cdot nH_2O$], fluorine apatite [FAP:$Ca_{10}(PO_4)_6F_2$], chlorine apatite [CAP:$Ca_{10}(PO_4)_6Cl_2$], hydroxyapatite [HAP:$Ca_{10}(PO_4)_6(OH)_2$], octacalcium phosphate [OCP:$Ca_8H_2(PO_4)_6 \cdot 5H_2O$], tricalcium phosphate [TCP:$Ca_3(PO_4)_2$], calcium hydrogenphosphate (DCP:$CaHPO_4$), calcium hydrogenphosphate.$2H_2O$ (DCPD:$CaHPO_4 \cdot 2H_2O$), etc., which may be used singly or in combination of two or more.

Among those, hydroxyapatite, octacalcium phosphate, tricalcium phosphate and calcium hydrogenphosphate are preferable from the viewpoint of the stability of the composition, and hydroxyapatite is more preferable. As to the content of hydroxyapatite which is most stable, not less than 10% by weight based on the total calcium phosphate type compound is preferable, not less than 50% by weight is more preferable, and not less than 90% by weight is most preferable.

The atomic ratio Ca/P in the inorganic dispersant of the present invention is not more than 16.7. From the viewpoint of a dispersing effect, not more than 5.56 is preferable, not more than 3.33 is more preferable, and not more than 1.85 is most preferable. The lower limit of the atomic ratio Ca/P is preferably about 1.67 from the viewpoint of maintaining the stability of the inorganic dispersant particles.

The average particle diameter dx1 of particles in the inorganic dispersant of the present invention is $0.1 \leq dx1 \leq 20$ ($\mu$m), preferably $0.2 \leq dx1 \leq 10$ ($\mu$m), more preferably $0.5 \leq dx1 \leq 5$ ($\mu$m). If the average particle diameter dx1 is less than 0.1 $\mu$m, the particles tend to agglomerate, and for example, when used for polymerization, the uniformity of polymer particles obtained lowers. If it is more than 20 $\mu$m, the dispersing effect lowers, and when used for polymerization, the particle size distribution of polymer particles obtained is not uniform and the polymer particles adhere to the walls of a polymerization vessel.

The dispersion coefficient $\alpha$ and the sharpness of particles in the inorganic dispersant of the present invention are $1 \leq \alpha \leq 5$ and $1 \leq \beta \leq 2$, respectively, preferably $1 \leq \alpha \leq 2$ and $0 \leq \beta \leq 1$, respectively. If the dispersion coefficient $\alpha$ is more than 5, coarse agglomerates increase and when used for polymerization, the particle size distribution is not uniform. If it is less than 1, fine particles tend to increase and to agglomerate and when used for polymerization, the polymer particles are not uniform. If the sharpness $\beta$ is more than 2, the particle size of the porous dispersant is not uniform and thus, when used for polymerization, the particle size of the polymer particles obtained are not uniform, either.

The average micropore diameter dx2 is $0.01 \leq dx2 \leq 1$ ($\mu$m). If it is less than 0.0/$\mu$m, when used for polymerization, the polymer particles obtained adhere to the walls of a polymerization vessel because of a low activity as a polymerization stabilizer, and if it is more than 1 $\mu$m, the viscosity during the polymerization increases to thereby lower the uniformity of the polymer particles obtained.

The static percentage of voids $\omega1$ and the pressurized percentage of voids $\omega2$ are $95 \leq \omega1 \leq 99$ and $70 \leq \omega2 \leq 95$, respectively. If the static percentage of voids $\omega1$ is less than 95 and if the pressurized percentage of voids $\omega2$ is less than 70, when used for polymerization, the polymer particles obtained agglomerate to thereby lower the dispersibility of the polymer particles. If the static percentage of voids $\omega1$ is more than 99 and if the pressurized percentage of voids $\omega2$ is more than 95, the viscosity during the polymerization increases to thereby lower the uniformity of the polymer particles obtained.

The BET specific surface area Sw1 is $50 \leq Sw1 \leq 500$ ($m^2/g$), preferably $100 \leq Sw1 \leq 400$ ($m^2/g$). If it is less than 50 $m^2/g$, when used for polymerization, the uniformity of the polymer particles obtained is not attained and the dispersibility of the polymer particles also lowers. If it is more than 500 $m^2/g$, the viscosity during the polymerization increases to thereby lower the uniformity of the polymer particles.

The preparation method of the inorganic dispersant of the present invention is not specifically limited. For example, the inorganic dispersant may be prepared by gradually reacting a water-soluble phosphoric acid or phosphate with calcium carbonate dispersed in water to thus produce a petaloid porous calcium phosphate type compound on the surface of a nucleating material i. e., calcium carbonate. More concretely, there is exemplified a method for mixing an aqueous suspension of calcium carbonate served as a nucleating material with a dilute aqueous solution of phosphoric acid and/or an aqueous suspension of calcium dihydrogen phosphate, and/or an aqueous suspension of calcium hydrogenphosphate.$2H_2O$ at a specific proportion under specific conditions, followed by aging under specific aging conditions.

The inorganic dispersant of the present invention may, for example, be produced by a method described in WO 97/03119. In this method, it is produced in a form of a water slurry and thus it may be used as a water slurry. It may, of course, be used as a powdered inorganic dispersant by dehydrating the water slurry, followed by drying and pulverizing, according to an ordinary method.

The inorganic dispersant of the present invention may be further added or coated by an ordinary method for enhancing dispersibility and stability, with coupling agents such as silane coupling agents and titanate coupling agents, organic acids such as fatty acids, resin acids, $\alpha$, $\beta$-monoethylenically unsaturated carboxylic acids like acrylic acids and esters thereof; surface treating agents including organic acids such as oxalic acid, citric acid and tartaric acid, inorganic acids such as hydrofluoric acid, polymers or copolymers thereof, salts or esters thereof; surfactants such as sodium dodecylbenzene sulfonate, sodium $\alpha$-olefin sulfonate, and sodium lauric acid sulfonate; condensed phosphoric acids and salts thereof such as hexametaphosphate, pyrophosphoric acid, sodium pyrophosphate, tripolyphosphoric acid, sodium tripolyphosphate, trimetaphosphoric acid and highpolyphosphoric acid.

The present invention relates, in a second aspect, to a stabilizer for suspension polymerization which comprises the inorganic dispersant as described above.

The present invention relates, in a third aspect, to polymer particles obtained by conducting suspension polymerization of vinyl monomers in a mixed system of the above-mentioned inorganic dispersant, a polymerization initiator and a dispersion medium. When the inorganic dispersant of the present invention is used as a stabilizer for suspension polymerization, polymer particles having a uniform and sharp particle size distribution are obtained. Moreover, it is also possible to control the particle size of the polymer particles.

The suspension polymerization may be carried out using the above-mentioned inorganic dispersant as a stabilizer for suspension polymerization without altering operations of the conventional suspension polymerization.

As the vinyl monomer, there are exemplified substituted or non-substituted styrene, (meth)acrylic acid esters, acrylonitrile, vinyl esters and olefins and these may be used singly or in combination of two or more. If necessary, it is possible to conjointly use other organic stabilizers, for example, water-soluble high polymer compounds such as polyvinyl alcohol, CMC, gelatin, surfactants such as sodium dodecylbenzene sulfonate, PH adjusting agents, gravity adjusting agents, viscosity adjusting agents, colorants etc.

The amount of the inorganic dispersant for suspension polymerization is varied according to the intended properties and suspension polymerization conditions, but in most cases, it is used in an amount of 0.1 to 10.0% by weight, preferably 0.15 to 5.0% by weight in terms, of solid based on the monomer used. The inorganic dispersant may be added in a lump before the initiation of suspension polymerization or may be added separately depending on the conversion rate. In addition, it may be used in combination with a commercially available hydroxyapatite dispersant.

The present invention relates, in a fourth aspect, to polymer particles obtained by dissolving a polymer in a solvent, dispersing the solution in water to obtain a suspension, and removing the solvent from the suspension.

Concretely, for example, the production of a toner is mentioned in which in a mother liquor containing a binder resin, a colorant and an organic medium, an aqueous suspension containing a surfactant and the inorganic dispersant is mixed and the organic medium and water are removed to thereby obtain a toner. As the binder resin, polyester resins, vinyl polymers etc., may be included.

The polyester resin may be produced by a known method using an alcohol ingredient and an acid ingredient as materials. As the vinyl polymer, it is preferred to use vinyl polymers from the viewpoint of well-balanced properties which are obtained by copolymerizing not less than 50% by weight of styrene based on the total monomers and not less than 50% by weight of at least one selected from alkyl acrylates and alkyl methacrylates based on the rest of monomers.

The colorant is selected from various organic or inorganic pigments and dyes whether a toner is a black one or a color one. As the colorant used for a black toner, for example, carbon black, acetylene black, black iron oxide, aniline black and cyanine black may be used, and among those, carbon black is preferably used. As the colorant for a color toner, for example, yellow colorants, red colorants, blue colorants, orange colorants, violet colorants and green colorants may be used.

As the organic medium, any organic medium may be used if it is able to dissolve a binder resin, and includes hydrocarbons such as toluene, xylene and hexane, halogenated hydrocarbons, alcohols, ethers, ketones and acetals. If necessary, surfactants such as sodium dodecylbenzene sulfonate, magnetic or magnetized materials, offset preventing agents, charge-controlling agents of positive charge or negative charge, and silica powder may be used singly or in combination of two or more.

The amount of the inorganic dispersant of the present invention is varied according to the intended properties and toner production conditions, but in most cases, it is 0.1 to 10.0% by weight, preferably 0.15 to 5.0% by weight in terms of solid based on the resin used. The inorganic dispersant may be added in a lump or may be added separately depending on the removing ratio of the medium.

The present invention relates, in a fifth aspect, to an unsaturated polyester resin composition which contains as a low shrink agent polymer particles obtained by suspension polymerization in a mixed system of the inorganic dispersant, vinyl monomers, a polymerization initiator and a dispersion medium. It is preferred to use three-dimensional polymer particles produced by adding a crosslinking agent such as divinylbenzene. As an ingredient of the unsaturated polyester resin composition, styrene type monomers such as styrene, α-methylstyrene, vinyltoluene and divinyltoluene, alkyl esters of acrylic acids or methacrylic acids, diallyl phthalate, diallyl isophthalate may be used in an amount used usually. If necessary, various additives, for example, fillers such as calcium carbonate and alumina, thickening agents such as magnesium oxide, magnesium hydroxide and calcium oxide, curing catalysts such as organic peroxides, colorants such as dyes and pigments may be added. The polyester resin composition may be molded into various molded articles by a method such as SMC, BMC, TMC and RIM.

It is possible to produce polymer particles having a sharp particle size distribution with a particle size of from about 30 to about 80 $\mu$m by suspension polymerization of vinyl monomers in the presence of the inorganic dispersant of the present invention. It is also possible to obtain molded articles excellent in low shrinkage, uniform dispersibility, gloss and transparency by blending the above, polymer particles into an unsaturated polyester resin.

The present invention relates, in a sixth aspect, to provide a toner composition containing polymer particles obtained by the use of the inorganic dispersant of the present invention. For the production of a binder resin for toner, there are two methods; one is a method for obtaining pulverized fine particles by pulverizing polymer particles obtained by suspension polymerization in a mixed system of vinyl monomers, a polymerization initiator and a dispersion medium to about 0.5 to about 10 $\mu$m in particle size to thereby obtain the fine particles, and another is a method for mixing a toner mother liquor containing the inorganic dispersant, a binder resin, a colorant and an organic medium with an aqueous solution containing a surfactant, then removing the organic medium and water to thereby obtain fine particles.

In the former case, it is possible to use a binder resin which is obtained by pulverizing by the use of a pulverizer such as a jet mill polymer particles having a sharp particle size distribution obtained by suspension polymerization by the use of the inorganic dispersant of the present invention, followed by classification. By the use of the inorganic dispersant of the present invention, ultrafine polymer particles with a particle size of about 0.5 to about 10 $\mu$m can be produced without damaging a sharp particle size distribution even by pulverization.

In the latter case, as described above, ultrafine polymer particles with a particle size of about 0.5 to about 10 $\mu$m as well as a sharp particle size distribution by the above-mentioned method can be produced.

By using such ultrafine polymer particles, it is possible to produce a toner which is high in resolution, less in scattering and easy in cleaning. The latter polymer particles are preferable in respect of sharpness in particle size distribution of toner particles.

The toner composition using the ultrafine polymer particles meets the demand of a color toner or a toner which has high resolution enabling a fine and delicate image.

Hereinafter, the present invention will be described in more detail by way of examples, which in no way limit the present invention.

In the following description, "%" and "parts" mean "% by weight" and "parts by weight", respectively.

EXAMPLES 1 to 4

Comparative Examples 1 to 4, Comparative Example 5

An aqueous suspension of calcium carbonate prepared by the below-mentioned method and a dilute solution of phosphoric acid were mixed under mixing conditions shown in Tables 1 and 2, then aged under aging conditions shown in Tables 1 and 2 to thus obtain inorganic dispersants A to H.

Aqueous Suspensioni of Calcium Carbonate

Furnace exhaust gas containing 27% of $CO_2$ was passed through 700 liters of milk of lime, 8° C. and 1.055 in specific gravity at a rate of 24 $m^3$/minute to conduct carbonation reaction until a pH reached 9.

Then, the reaction product was aged at 40 to 50° C. for 5 hours to cause alkali among particles to eluate and to disperse them at a pH 10.8, and an aqueous suspension of calcium carbonate was obtained which has an average particle diameter of 0.05 μm measured by a photograph of an electron microscope and an average particle diameter of 0.48 μm measured by a particle size distribution tester (SA-CPS manufactured by Shimadzu Corp.).

Mixing Conditions

Solid concentration of the aqueous suspension of calcium carbonate: 1–15%;
Phosphoric acid concentration of the dilute aqueous solution: 1–50%;
Peripheral speed of a stirring blade; 0.5–50 m/sec;
Mixing time: 0.1–150 hours;
Temperature of the aqueous suspension: 0–80° C.; and
pH of the aqueous suspension: 5–9.

Aging Conditions

Calcium concentration: 0.414 5%;
Aging time: 0.1–100 hours;
Temperature of the aqueous suspension: 20–80 ° C.;
pH of the aqueous suspension: 6–9; and
Peripheral speed of a stirring blade: 0.5–50 m/sec.

TABLE 1

| Examples | 1 | 2 | 3 | 4 |
|---|---|---|---|---|
| Inorganic dispersants | A | B | C | D |
| Solid conc. of calcium carbonate aqueous suspension (wt. %) | 5 | 10 | 5 | 10 |
| Solid conc. of dilute aqueous solution of phosphoric acid (wt. %) | 10 | 10 | 5 | 10 |
| Atomic ratio Ca/p | 1.96 | 1.75 | 1.67 | 4.76 |
| Mixing conditions: | | | | |
| Mixing time hr | 2.5 | 4.0 | 10 | 1.5 |
| Temperature of aqueous suspension ° C. | 50 | 50 | 50 | 30 |
| pH of aqueous suspension | 6–6.8 | 6–6.8 | 6–6.8 | 6–6.8 |
| Peripheral speed of stirring blade m/sec | 5 | 5 | 10 | 1 |

TABLE 1-continued

| Examples | 1 | 2 | 3 | 4 |
|---|---|---|---|---|
| Inorganic dispersants | A | B | C | D |
| Aging conditions: | | | | |
| Conc. of Ca (wt. %) | 1.6 | 2.6 | 1.3 | 3.3 |
| Aging time hr | 1 | 1 | 1 | 5 |
| Temperature of aqueous suspension ° C. | 50 | 50 | 50 | 50 |
| pH of aqueous suspension | 7–8 | 7–8 | 7–8 | 7–8 |
| Peripheral speed of stirring blade m/sec | 5 | 5 | 10 | 1 |

TABLE 2

| Comparative Examples | 1 | 2 | 3 | 4 |
|---|---|---|---|---|
| Inorganic dispersants | E | F | G | H |
| Solid conc. of calcium carbonate aqueous suspension (wt. %) | 10 | 10 | 10 | 5 |
| Solid conc. of dilute aqueous solution of phosphoric acid (wt. %) | 10 | 10 | 10 | 10 |
| Atomic ratio Ca/p | 4.76 | 1.75 | 1.75 | 20.83 |
| Mixing conditions: | | | | |
| Mixing time hr | 0.07 | 1.5 | 1.5 | 0.05 |
| Temperature of aqueous suspension ° C. | 40 | 40 | 30 | 50 |
| pH of aqueous suspension | 6–6.5 | 6–6.5 | 6–6.5 | 6–6.5 |
| Peripheral speed of stirring blade m/sec | 0.2 | 1.0 | 5.0 | 0.2 |
| Aging conditions: | | | | |
| Conc. of Ca (wt. %) | 3.3 | 2.6 | 2.6 | 2.0 |
| Aging time hr | 1 | 1 | 1 | 1 |
| Temperature of aqueous suspension ° C. | 40 | 40 | 30 | 50 |
| pH of aqueous suspension | 7–8 | 7–8 | 7–8 | 7–8 |
| Peripheral speed of stirring blade m/sec | 0.3 | 0.3 | 0.2 | 0.2 |

The properties of the inorganic diepersants A to H prepared by Examples 1 to 4 and Comparative Examples 1 to 4 and the commercially available hydroxyapatite I (Trade name: tricalcium phosphate manufactured by Yoneyama Chemical Industry Co., Ltd.) are shown in Table 3. w1 and w2 and the HAP content were measured by the use of ones obtained by dehydrating the inorganic dispersants A to H and the commercially available hydroxyapatite I, drying them in a dried atmosphere of not higher than 700° C. and finishing by pulverization.

Figure 1:
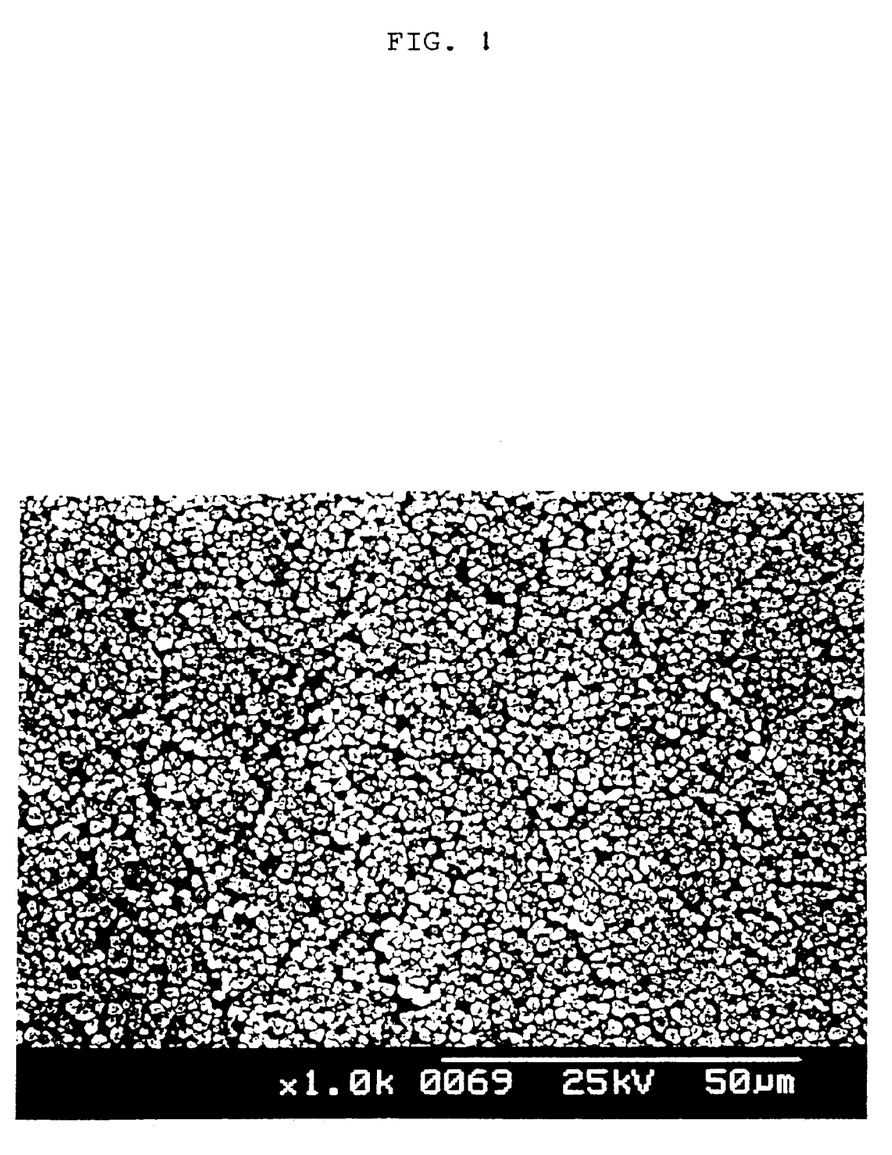
FIG. 1 is a photograph of an electron microscope (×1000 magnification) showing a particle structure of inorganic dispersant A.
Figure 2:
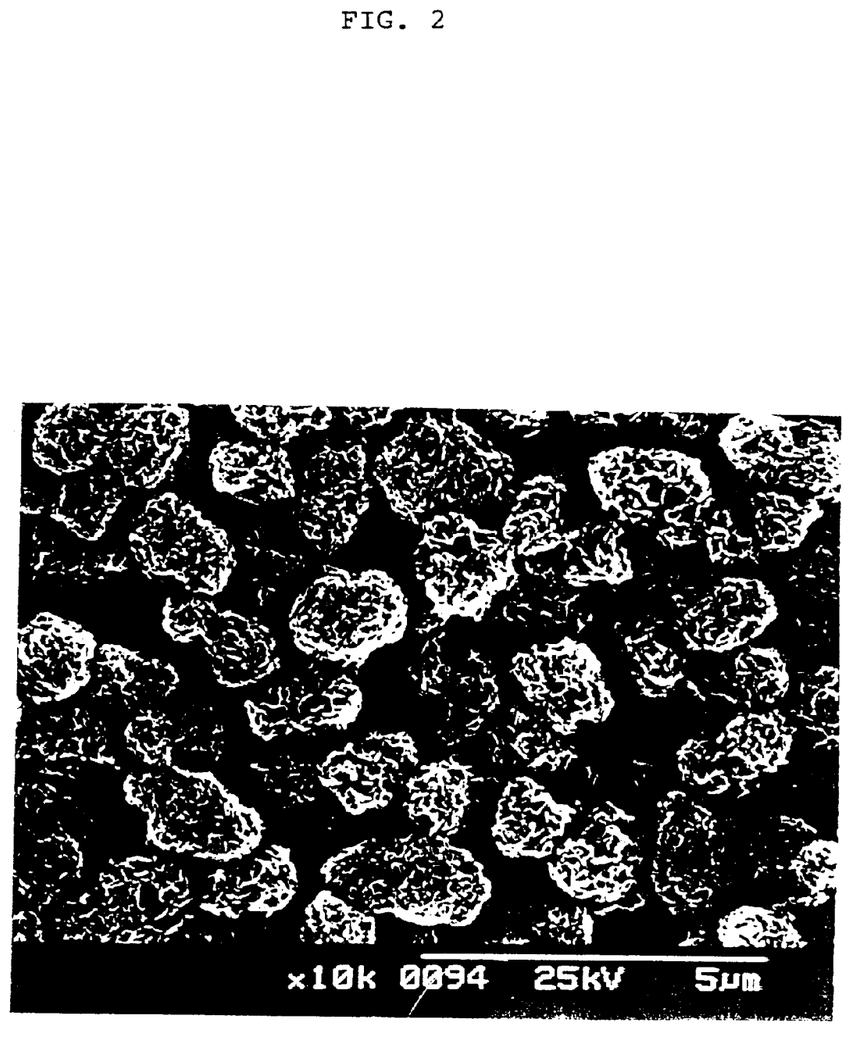
FIG. 2 is a photograph of an electron microscope (×10000 magnification) showing a particle structure of inorganic dispersant A.
Figure 3:
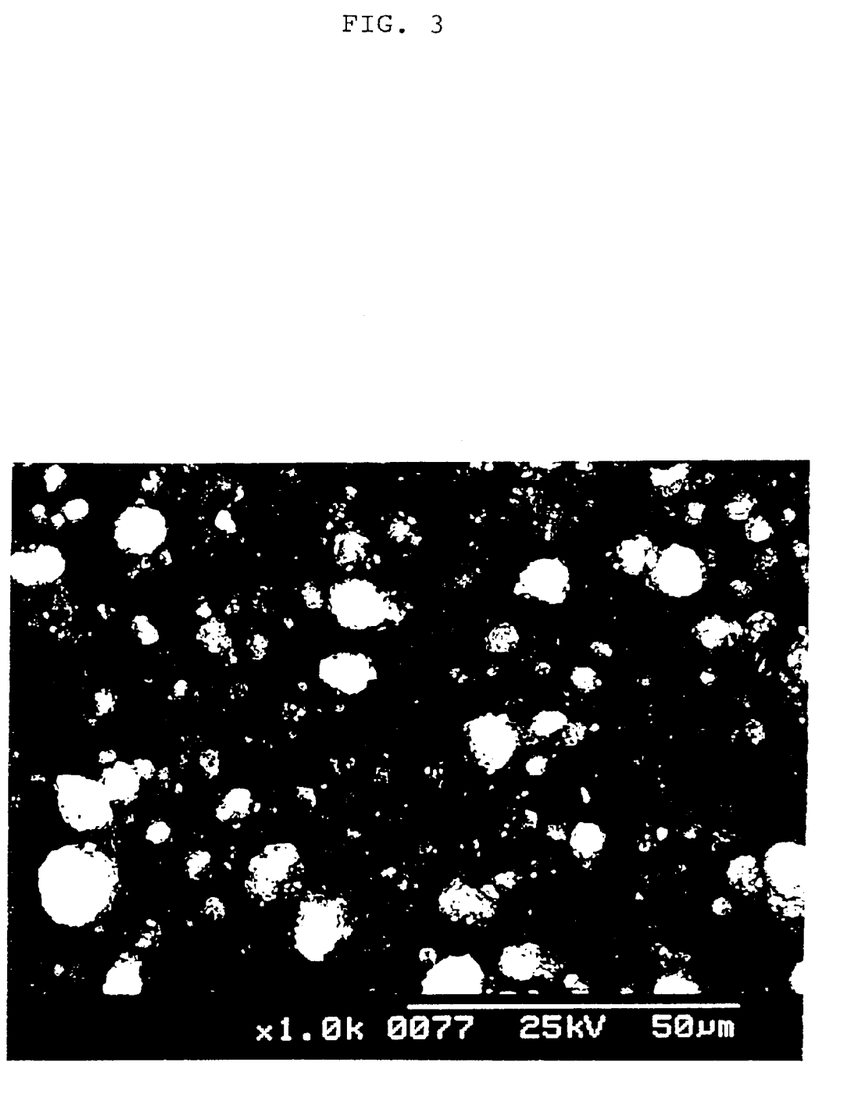
FIG. 3 is a photograph of an electron microscope (×1000 magnification) showing a particle structure of a commercially available hydroxyapatite particle.
Figure 4:
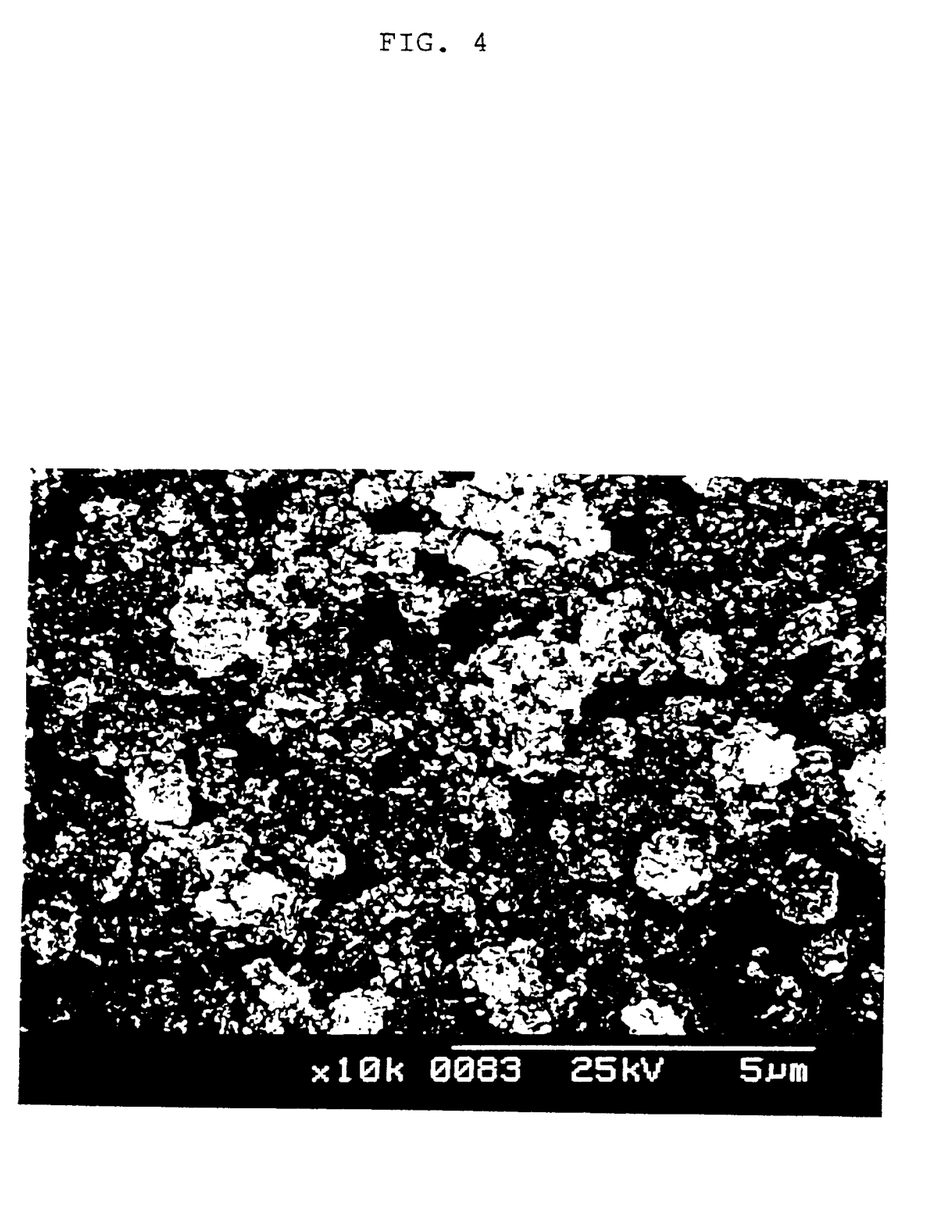
FIG. 4 is a photograph of an electron microscope (×10000 magnification) showing a particle structure of a commercially available hydroxyapatite particle.
Figure 5:
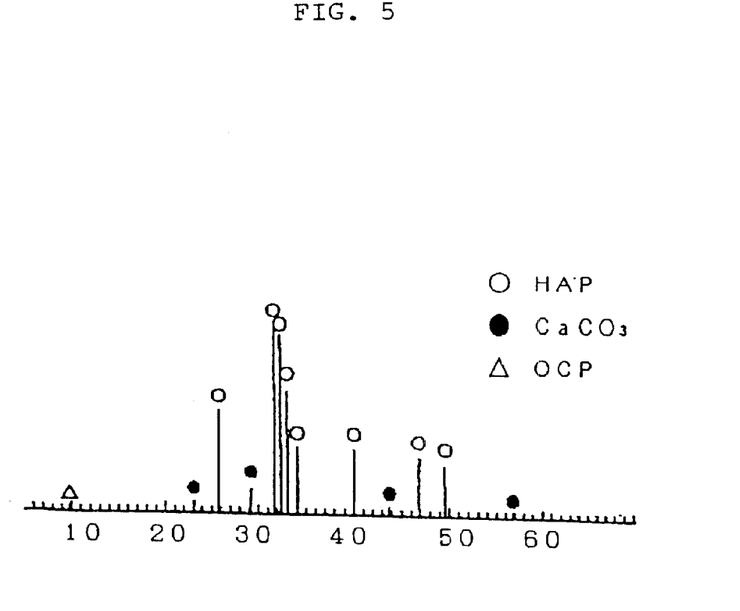
FIG. 5 is an X-ray diffraction pattern of an inorganic dispersant A.
Figure 6:
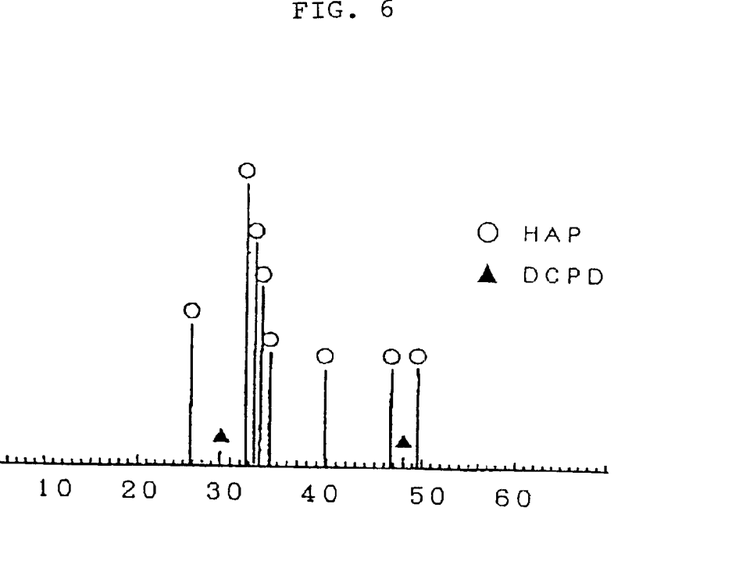
FIG. 6 is an X-ray diffraction pattern of a commercially available hydroxyapatite particle.

For the comparison of the surfaces of the particles, electron microscopic photographs of the particle A and the commercially available hydroxyapatite showing the particle structure are shown in FIG. 1 (×1000 magnification), FIG. 2 (×10000 magnification), FIG. 3 (×1000 magnification), and FIG. 4 (×10000 magnification). From FIGS. 1 and 2, it is understood that the particle A has a petaloid porous structure, while from FIGS. 3 and 4, the commercially available hydroxyapatite are agglomerates of fine particles, having no such petaloid porous structure. The powder X-ray diffraction patterns of the particle A and the commercially available hydroxyapatite are shown in FIG. 5 and FIG. 6, respectively.

TABLE 3

| Inorganic dispersant * | Examples | | | | Comparative Examples | | | | |
|---|---|---|---|---|---|---|---|---|---|
| | 1 | 2 | 3 | 4 | 1 | 2 | 3 | 4 | 5 |
| | A | B | C | D | E | F | G | H | I |
| d x 1 μm | 1.6 | 0.8 | 0.4 | 4.0 | 0.1 | 0.4 | 1.6 | 25 | 0.08 |
| α | 1.1 | 1.1 | 1.1 | 1.5 | 35 | 5.2 | 25 | 3.0 | 27 |
| β | 0.6 | 0.6 | 0.7 | 0.8 | 5.2 | 2.0 | 3.0 | 3.0 | 3.1 |
| d x 2 μm | 0.02 | 0.01 | 0.01 | 0.05 | 0.01 | 0.01 | 0.02 | 1.2 | — |
| ω1 | 96 | 96 | 97 | 95 | 95 | 96 | 96 | 90 | 91 |
| ω2 | 84 | 85 | 86 | 78 | 75 | 85 | 85 | 68 | 68 |
| S w 1 | 150 | 160 | 170 | 85 | 85 | 170 | 170 | 45 | 110 |
| H A P % | 85 | 95 | 100 | 35 | 35 | 95 | 95 | 8 | 100 |

* The inorganic dispersant was dispersed in water by T.K. HOMO DISPER (manufactured by Tokushu Kakoki Kogyo Co., Ltd.) to prepare a slurry having a solid concentration of 10%.

EXAMPLES 5 to 8

Comparative Examples 6 to 10

As shown in Table 4, styrene was suspension polymerized by the use of the inorganic dispersants A to I having a solid concentration of 10% as a suspension stabilizer.

Into a stainless autoclave equipped with stirring blades, the following materials were charged and air in the autoclave was substituted with nitrogen gas. Then, the suspension polymerization was continued at 90° C. for 10 hours with stirring at 350 rpm. Thereafter, the resulting polymer was dehydrated by the use of a centrifugal separator, the inorganic dispersant was dissolved with hydrochloric acid, the polymer was washed with water to thus obtain polystyrene particles. The results are shown in table 4.

| Styrene monomer | 100 parts |
|---|---|
| Stabilizer (Inorganic dispersant slurry) | |
| (calculated as a solid) | 0.3 part |
| Sodium dodecylbenzene sulfonate | 0.01 part |
| Benzoyl peroxide | 0.2 part |
| Water | 100 parts |

The average particle diameters (D50) and the particle size distributions and yields (peak 3 sieve) of the polystyrene particles are shown in Table 4. Moreover, the adhesion of the polymer particles onto the walls of the autoclave was observed with naked eyes.

The polystyrene particles were classified by the use of JIS standard sieve openings 2.36 mm (7.5-mesh), openings 2.00 mm (8.6-mesh), openings 1.70 mm (10-mesh), openings 1.40 mm (12-mesh), openings 1.18 mm (14-mesh), openings 1.18 mm (14-mesh), openings 1.00 mm (16-mesh), openings 0.85 mm (18-mesh), openings 0.71 mm (22-mesh), openings 0.60 mm (26-mesh), openings 0.50 mm (30-mesh), openings 0.425 mm (36-mesh), openings 0.355 mm (42-mesh), openings 0.300 mm (50-mesh), openings 0.250 mm (60-mesh), openings 0.121 mm (70-mesh) and openings 0.18 mm (83-mesh), and the particle diameter (median diameter) at which the accumulated weight become 50% based on an accumulated particle size distribution curve is assigned to D50, and a proportion of the particle size distribution of three-sieve ranges from the greater distributions chosen from the ranges including the particle diameter D50 is defined as the peak 3-sieve.

TABLE 4

| | | Polymerization results | | |
|---|---|---|---|---|
| | Inorganic dispersant | Average particle diameter (μm) | Particle size distribution yield (%) Peak 3-sieve | Adhesion of particles onto the walls of the autoclave |
| Example | | | | |
| 5 | A | 550 | 92 | No adhesion |
| 6 | B | 570 | 93 | No adhesion |
| 7 | C | 500 | 93 | No adhesion |
| 8 | D | 600 | 90 | No adhesion |
| Comp. Ex. | | | | |
| 6 | E | 600 | 78 | Partial adhesion |
| 7 | F | 500 | 80 | Partial adhesion |
| 8 | G | 500 | 79 | Partial adhesion |
| 9 | H | 500 | 60 | Overall adhesion |
| 10 | I | 450 | 80 | Partial adhesion |

EXAMPLES 9 to 12

Comparative Examples 11 to 15

As shown in Table 5, the inorganic dispersants A to I having a solid concentration of 10% were used as a suspension stabilizer and three-dimensional polymer fine particles were produced in the following manner:

150 liters (150 Kg) of materials for three-dimensional fine particles comprising 100 parts of styrene, 0.4 part of divinylbenzene, 0.6 part of benzoyl peroxide, 140 parts of water, 25 parts of the inorganic dispersants A to I having a solid concentration of 10% (Solid: 2.5 parts) and 1 part of 1% solution of sodium dodecylbenzene sulfonate were charged into a cylindrical vessel 600 mm in inside diameter and 650 mm in height, equipped with TK homomixer-HV-SV type, and subjected to high speed shearing stirring at 3300 to 3500 rpm for 15 minutes. After the contents were charged into a reactor, the temperature of the reactor was raised to 80° C. to continue the polymerization for 10 hours. After the polymerization terminated, the reaction product was cooled, dehydrated and dried to thereby obtain three-dimensional fine polymer particles.

The three-dimensional polymer particles thus obtained were evaluated in the following manner and the results are shown in Table 5.

Measurement of the Particle Size Distribution of the Fine Polymer Particles

Coulter counter (ZM type manufactured by Nikkaki Co., Ltd.) was used. As an electrolyte, Aiton H (manufactured by Nikkaki Co., Ltd.) was used. The particle size distribution was measured according to a manual.

Yield was represented by the polymer particles having a particle diameter of 30 to 80 μm.

Adhesion of Three-dimensional Polymer Particles onto the Walls of a Reactor

Observation was made with naked eyes.

TABLE 5

| | | Polymerization results | | |
|---|---|---|---|---|
| | Inorganic dispersant | Average particle diameter (μm) | Yield % | Adhesion of particles onto the walls of the autoclave |
| Example | | | | |
| 9 | A | 55 | 93 | No adhesion |
| 10 | B | 50 | 95 | No adhesion |
| 11 | C | 48 | 91 | No adhesion |
| 12 | D | 60 | 90 | No adhesion |
| Comp. Ex. | | | | |
| 11 | E | 120 | 50 | Partial adhesion |
| 12 | F | 95 | 55 | Partial adhesion |
| 13 | G | 100 | 57 | Partial adhesion |
| 14 | H | 100 | 45 | Overall adhesion |
| 15 | I | 120 | 55 | Partial adhesion |

EXAMPLES 13 to 16

Comparative Examples 16 to 20

Using the three-dimensional polymer particles prepared in Table 5 as an a low shrink agent, unsaturated polyester compositions were produced in the following manner. From these compositions, BMC molded articles were obtained and tested for a degree of shrinkage, irregularity of coloring and gloss, and transparency. The results are shown in Table 6.

(1) Production of Unsaturated Polyester Resin Compositions

Into a vessel equipped with a stirrer, 100 parts of an unsaturated polyester resin (Polyset PS-9126-2: Mixture of an unsaturated polyester resin comprising maleic acid, terephthalic acid and propylene glycol with styrene monomer, manufactured by Hitachi Chemical Co., Ltd.), 1.5 part of a curing agent (Perbutyl Z manufactured by NOF Co rp.), 200 parts of a filler (Haijilite H320 manufactured by Showa Denko Co., L t d. ), 0.3 part of a thickening agent (magnesium oxide) and 15 parts of the three-dimensional polymer particles prepared in Table 5 were adequately dispersed to thereby obtain unsaturated polyester resin compositions.

(2) Production of BMC Molded Articles 10 parts of a reinforcer (glass fiber manufactured by Nittobo Co. Ltd.) were blended with 100 parts of the above-mentioned unsaturated polyester resin composition and kneaded well for 10 minutes by the use of a kneader to thereby prepare compounds. Then, the compounds were wrapped in a polyethyleneterephthalate film so as to prevent scattering of styrene and aged at 40° C. for 20 hours. 700 g of the aged compounds were introduced into a mold 220 mm×220 mm in sizes and molded under conditions of a molding temperature 140° C., molding pressure 100 Kg/cm$^2$ and molding time 9 minutes to thereby obtain BMC molded articles having a thickness of 6 mm.

(3) Evaluation of the Molded Articles

Degree of Shrinkage

The length of an edge of the BMC molded article corresponding to the mold length 220 mm was measured and the degree of shrinkage was calculated by the following equation:

Degree of shrinkage (%)=[(220−measured length of the molded article)/220]×100

Irregularity in Coloring and Gloss

The presence or no of irregularity in coloring and gloss was observed with naked eyes.

Transparency

The transmittance of the BMC molded article was measured by the use of a turbidimeter manufactured by Nippon Denshoku Industry Co., Ltd. The transmittance without locating a sample at a sample position was assigned to 100% and the transmittance with the sample position shielded was assigned to 0%. After the necessary compensation was made, the BMC molded article was located at the sample position and the transmittance was measured.

TABLE 6

| | Three-dimensional polymer particles | Evaluation results of BMC | | |
|---|---|---|---|---|
| | | Shrinkage (%) | Irregularity in coloring and gloss | Transparency (Transmittance %) |
| Example | Example | | | |
| 13 | 9 | 0.41 | Absence | 9 |
| 14 | 10 | 0.42 | Absence | 10 |
| 15 | 11 | 0.38 | Absence | 10 |
| 16 | 12 | 0.41 | Absence | 12 |
| Comp. Ex. | Comp. Ex. | | | |
| 16 | 11 | 0.80 | Presence | 14 |
| 17 | 12 | 0.72 | Presence | 15 |
| 18 | 13 | 0.78 | Presence | 16 |
| 19 | 14 | 0.73 | Presence | 14 |
| 20 | 15 | 0.70 | Presence | 14 |

EXAMPLES 17 to 20

Comparative Examples 21 to 25

Using the inorganic dispersants A to I, toners were produced in the following manner and properties were evaluated.

(1) Production of Toner Compositions 92 parts of a binder resin (polyester resin), 6 parts of a colorant (copper phthalocyanine blue C.I. 74160), 200 parts of an organic medium (toluene) and 2 parts of an additive (LR-147) were charged into a ball mill and stirred to such an extent that colorant particles were ground to a submicron level and thus a mother liquor was prepared.

The mother liquor thus obtained was added to an aqueous solution containing 30 parts of the inorganic dispersants A to I, 6 parts of a surfactant (sodium dodecylbenzene sulfonate 1% aqueous solution) and 540 parts of water in a homogenizer and stirred at 11 to 19 m/sec in peripheral speed of a rotor and at 35° C.

After the termination of dispersing, toluene was removed at 60 to 75° C. and at a degree of vacuum of 237×10$^2$ to 384×10$^2$ Pa. After the removal of toluene, an aqueous solution containing a toner was cooled and stirred with a 35% hydrochloric acid added until a pH reached 2, the toner was washed with water to remove the inorganic dispersant and dried to thereby obtain a toner. To 100 parts of the toner thus obtained, 0.2 part of Aerosil (R 972 manufactured by Nippon Aerosil Co., Ltd.) was added and mixed and stirred by the use of Henschel mixer to thereby obtain a toner containing an external additive.

(2) Evaluation of the Toner Composition

A developer was prepared by adding 5% of the toner obtained in the above (1) to 95% of a copper-zinc ferrite carrier coated with a acrylic resin-denatured silicone resin having a particle diameter of 40 μm. Using the developer, copying was conducted continuously at 25° C. and at a relative humidity of 65% by the use of a full color printer QMS Color Script Laser 1000 (manufactured by QMS Co., Ltd.) capable of copying 8 sheets of A4 size per minute. The copied (printed) matters were evaluated according to the following criteria. The results are shown in Table 7.

(a) Reproducibility of Color Tone

A color image was copied on an OHP (overhead projector) film and the reproducibility of the color image by an OHP was evaluated by the following criteria:

Excellent: Chromatic colors and neutral tints develop throughly.

Good: Chromatic colors and neutral tints develop considerably.

Bad: Chromatic colors do not develop.

(b) Image Density, Fog and Degree of Resolution

Resolution and fog were measured by the use of Macbeth reflection densitometer RD 514 type (manufactured by Kolinorgen Corp.). Resolution was observed with naked eyes by copying an image of the chart No. 5-2 of Association of Electrophotography, enlarging it 10-fold, and observing with naked eyes how many lines having the same widths and intervals per mm (line pair/mm) resolve.

(c) Scattering of the Toner

Scattering of the toner was observed with naked eyes.

Good: Scattering is not observed.

Bad: Scattering is observed.

(d) Cleaning

Residual toner on a light-sensitive drum having passed a cleaning step was transferred onto a white paper by the use of Scotch tape (manufactured by Sumitomo 3M Limited), subjected to the measurement by Macbeth reflection densitometer RD 514 type and a difference between the measured value and a blank value was inspected.

Excellent: The difference is not more than 0.04 and cleaning is extremely good.

Good: Cleaning is in proportion to the above and is good.

Bad: Cleaning is poor.

tion. Moreover, when the polymer particles are contained in an unsaturated polyester resin composition and a toner composition, the obtained compositions have excellent quality.

What is claimed is:

1. An inorganic dispersant which comprises particles of a calcium phosphate compound and/or a calcium phosphate-calcium carbonate composite having a petaloid porous structure and an atomic ratio Ca/P of not more than 16.7, said particles satisfying the following formulas (a) to (g):

$$0.1 \leq dx1 \leq 20 (\mu m), \quad (a)$$

$$1 \leq \alpha \leq 5, \text{ where } \alpha = d50/dx1, \quad (b)$$

$$0 \leq \beta \leq 2, \text{ where } \beta = (d90-d10)/d50, \quad (c)$$

$$0.01 \leq dx2 \leq 1 (\mu m), \quad (d)$$

$$95 \leq \omega 1 \leq 99, \quad (e)$$

$$70 \leq \omega 2 \leq 95, \quad (f)$$

$$50 \leq Sw1 \leq 500 (m^2/g), \quad (g)$$

wherein, dx1: Average particle diameter (μm) measured by a photograph of an electron microscope;

α: Dispersion coefficient;

d50: 50% average particle diameter (μm) measured by a particle size distribution tester using a Microtrac FRA laser;

β: Sharpness;

d90: 90% particle diameter of the total particles passed through a sieve measured by a particle size distribution tester using a Microtrac FRA laser;

d10: 10% particle diameter of the total particles passed through a sieve measured by a particle size distribution tester using a Microtrac FRA laser;

dx2: Average micropore diameter (μm) of particles measured from a micropore distribution measured by a mercury penetration method;

ω1: Static percentage of voids (%) calculated from the following equation (h):

TABLE 7

| | | Printing characteristics | | | | | |
|---|---|---|---|---|---|---|---|
| | Inorganic dispersant | Color tone reproducibility | Image density | Fog | Resolution | Toner scattering | Cleaning |
| Example | | | | | | | |
| 17 | A | Excellent | 1.5 | 0.08 | 7.0 | Good | Excellent |
| 18 | B | Excellent | 1.6 | 0.08 | 7.0 | Good | Excellent |
| 19 | C | Excellent | 1.5 | 0.08 | 7.0 | Good | Excellent |
| 20 | D | Excellent | 1.5 | 0.09 | 7.0 | Good | Excellent |
| Comp. Ex. | | | | | | | |
| 21 | E | Bad | 1.0 | 0.12 | 5.8 | Good | Excellent |
| 22 | F | Good | 1.1 | 0.10 | 6.0 | Bad | Good |
| 23 | G | Good | 1.1 | 0.10 | 6.2 | Bad | Bad |
| 24 | H | Bad | 0.8 | 0.12 | 5.5 | Good | Bad |
| 25 | I | Good | 1.0 | 0.10 | 6.2 | Good | Good |

As described above, the inorganic dispersant of the present invention has a high specific surface area and a high surface activity, and therefore, for example, when used as a suspension polymerization stabilizer, it provides polymer particles having a uniform and sharp particle size distribu- $$\omega 1 = \left\{ 1 - \frac{1}{2.9 \times [\text{apparent specific volume}]} \right\} \times 100(\%) \quad (h)$$

wherein the apparent specific volume (ml/g) is measured according to a static method of pigment test according to JIS K5101-91 20.1, ω2: Pressurized percentage of voids (%) calculated from the following equation (i):

$$\omega 2 = \left\{1 - \frac{0.5}{2.9 \times 2 \times [\text{thickness}]}\right\} \times 100(\%) \quad (i)$$

wherein the thickness is measured by a slide calipers after packing 0.5 g of a sample in a cylinder having a cross section of 2 cm$^2$, pressurizing the sample with a pressure of 30 kg/cm$^2$ for 30 seconds.

Sw1: BET specific surface area m$^2$/g by a nitrogen adsorbing method.

2. The inorganic dispersant of claim 1, wherein the particles have the average particle diameter dx1 satisfying the following formula (j):

$$0.2 \leq dx1 \leq 10(\mu m). \quad (j)$$

3. The inorganic dispersant of claim 1, wherein the particles have the average particle diameter dx1 satisfying the following formula (k):

$$0.5 \leq dx1 \leq 5(\mu m). \quad (k)$$

4. The inorganic dispersant of any one of claims 1 to 3, wherein the particles have the dispersion coefficient α and the sharpness β both satisfying the following formulas (l) and (m), respectively:

$$1 \leq \alpha \leq 2; \quad (l)$$

and $$0 \leq \beta \leq 1 \quad (m).$$

5. The inorganic dispersant of any one of claims 1 to 3, wherein the particles have the BET specific surface area Sw1 satisfying the following formula (n):

$$100 \leq Sw1 \leq 400(m^2/g). \quad (n)$$

6. The inorganic dispersant of any one of claims 1 to 3, wherein the atomic ratio Ca/P is not more than 5.56.

7. The inorganic dispersant of any one of claims 1 to 3, wherein the atomic ratio Ca/P is not more than 3.33.

8. The inorganic dispersant of any one of claims 1 to 3, wherein the atomic ratio Ca/P is not more than 1.85.

9. The inorganic dispersant of any one of claims 1 to 3, wherein the calcium phosphate compound is hydroxyapatite represented by the chemical formula $Ca_{10}(PO_4)_6(OH)_2$.

10. A stabilizer for suspension polymerization which comprises the inorganic dispersant defined by any one of claims 1 to 3.

11. Polymer particles obtained by suspension polymerizing at least one of vinyl monomers capable of suspension polymerization in a mixture of a polymerization initiator, a dispersion medium and the inorganic dispersant defined by any one of claims 1 to 3.

12. Polymer particles obtained by dissolving a polymer in a solvent using as a stabilizer the inorganic dispersant defined by any one of claims 1 to 3, dispersing the solution in water to obtain a suspension, and removing the solvent from the suspension.

13. An unsaturated polyester resin composition containing as a low shrink agent the polymer particles defined by claim 12.

14. A toner composition using the polymer particles defined by claim 11.

15. A toner composition using the polymer particles defined by claim 12.

16. The inorganic dispersant of any one of claims 1 to 3, wherein the calcium phosphate compound is present and is at least one member selected from the group consisting of amorphous calcium phosphate [ACP: $Ca_2(PO_4)_2 \cdot nH_2O$], fluorine apatite [FAP: $Ca_{10}(PO_4)_6F_2$], chlorine apatite [CAP: $Ca_{10}(PO_4)_6Cl_2$], hydroxyapatite [HAP: $Ca_{10}(PO_4)_6(OH)_2$], octacalcium phosphate [OCP: $Ca_8H_2(PO_4)_6 \cdot 5H_2O$], tricalcium phosphate [TCP: $Ca_3(PO_4)_2$], calcium hydrogenphosphate (DCP: $CaHPO_4$) and calcium hydrogenphosphate.2H$_2$O (DCPD: $CaHPO_4 \cdot 2H_2O$).

* * * * *